(12) United States Patent
Foucher

(10) Patent No.: US 8,147,187 B2
(45) Date of Patent: Apr. 3, 2012

(54) CONTROL OF VARIABLE-PITCH BLADES

(75) Inventor: Christelle Foucher, Cesson (FR)

(73) Assignee: SNECMA, Paris (FR)

( * ) Notice: Subject to any disclaimer, the term of this patent is extended or adjusted under 35 U.S.C. 154(b) by 1056 days.

(21) Appl. No.: 12/035,254

(22) Filed: Feb. 21, 2008

(65) Prior Publication Data

US 2008/0206045 A1 Aug. 28, 2008

(30) Foreign Application Priority Data

Feb. 22, 2007 (FR) ...................... 07 01258

(51) Int. Cl.
| | |
|---|---|
| *F01B 25/02* | (2006.01) |
| *F01D 17/12* | (2006.01) |
| *F03D 7/00* | (2006.01) |
| *F04D 15/00* | (2006.01) |
| *F04D 27/00* | (2006.01) |
| *F04D 29/56* | (2006.01) |
| *F04D 29/04* | (2006.01) |

(52) U.S. Cl. ........ 415/155; 415/159; 415/160; 415/163; 415/229; 384/192

(58) Field of Classification Search ................. 415/155, 415/159, 160–163, 209.3, 229; 384/192–214
See application file for complete search history.

(56) References Cited

U.S. PATENT DOCUMENTS

| 3,471,126 | A | | 10/1969 | Abild | |
|---|---|---|---|---|---|
| 3,674,377 | A | * | 7/1972 | Trappmann | 415/147 |
| 4,060,287 | A | * | 11/1977 | Orkin | 384/208 |
| 5,580,233 | A | * | 12/1996 | Wakana et al. | 418/94 |
| 6,699,010 | B2 | * | 3/2004 | Jinnai | 415/164 |
| 6,890,151 | B2 | * | 5/2005 | Bertrand et al. | 415/209.2 |
| 7,112,040 | B2 | * | 9/2006 | Debeneix et al. | 415/160 |
| 2007/0059161 | A1 | * | 3/2007 | Bouru | 415/160 |
| 2007/0189649 | A1 | * | 8/2007 | Montazeri et al. | 384/192 |
| 2007/0230844 | A1 | * | 10/2007 | King et al. | 384/192 |
| 2008/0025837 | A1 | * | 1/2008 | Lejars et al. | 415/161 |

FOREIGN PATENT DOCUMENTS

| FR | 1.325.261 | 4/1963 |
|---|---|---|
| GB | 825547 | 12/1959 |

* cited by examiner

*Primary Examiner* — Edward Look
*Assistant Examiner* — Su Htay
(74) *Attorney, Agent, or Firm* — Oblon, Spivak, McClelland, Maier & Neustadt, L.L.P.

(57) ABSTRACT

A device for controlling a pivot of a variable-pitch blade in a stator of a turbomachine compressor is disclosed. The device for controlling a pivot of a variable-pitch blade includes a control lever and a pivot with a bottom end and a top end. The top end is connected to the control lever. The device also includes a first swivel bearing placed at the bottom end of the pivot and a second swivel bearing placed at the top end of the pivot.

15 Claims, 3 Drawing Sheets

CONTROL OF VARIABLE-PITCH BLADES

The present invention relates to the control of variable-pitch blades, particularly a device for controlling a pivot of a variable-pitch blade in a turbomachine compressor.

BACKGROUND OF THE INVENTION

An aviation turbomachine conventionally comprises a compressor, a combustion chamber and a turbine. The role of the turbine is to rotate the compressor while drawing a portion of the pressure energy from the hot gases leaving the combustion chamber and transforming it into mechanical energy.

An axial compressor consists of a rotating portion, the rotor, a fixed portion, the stator, and a shroud, the casing, the stator and the casing being fixedly attached to one another. The rotor comprises a drum consisting of an assembly of several disks to which movable blades are attached in a circumferential array. The stator consists of a plurality of blades attached to the casing or to rings in a circumferential array. Each array of fixed blades of the stator, called stator blades, forms a synchronizing ring. An array of movable blades and an array of fixed blades form a compressor stage.

In a compressor, to optimize the efficiency of the turbomachine and the surge margin depending on the speed, one or more arrays of stator blades may have a variable pitch, that is to say that the angle of attack of these blades varies according to the flight conditions.

DESCRIPTION OF THE PRIOR ART

The known devices for controlling the pivots of a variable-pitch blade often comprise a control ring surrounding a casing of the turbomachine and a plurality of levers or link rods. Each lever comprises, on the one hand, a first end mounted rigidly on a pivot fixedly attached to a blade whose axis of rotation is oriented radially relative to the axis of revolution of the turbomachine and, on the other hand, a second end connected to the control ring. The synchronized modification of the angular position of the blades is obtained by rotating the control ring about the axis of the turbomachine. Such a system is illustrated in FIG. 1 of document U.S. Pat. No. 5,024,580.

The pivot of a blade is placed in a bore usually made in the casing and oriented radially relative to the axis of the turbomachine. The movements of the control ring, of the lever and of the pivot in order to vary the pitch expose the zones of contact of these parts to damage, which is accentuated by the vibrations of the turbomachine. The most significant wear is noted between the pivot and the bore because of the pressures of peening which is prejudicial to the mechanical strength of the parts and therefore their service life. In addition, a partial or total loss of precision in the pitch of the blades is prejudicial to the correct operation of the turbomachine and particularly its efficiency.

To reduce the wear between the pivot and the bore, it is known practice to interpose between these parts one or more cylindrical bushes playing the role of a bearing and dry lubricant. Examples of cylindrical bushes are illustrated in the various figures of document EP 1500791. The materials used for these cylindrical bushes usually originate from two families: organics and inorganics. When the temperature conditions allow, that is to say below 300° approximately, organic materials are usually used. Beyond this, inorganic materials are preferred.

To improve the efficiency of these cylindrical bushes, many solutions in terms of material or coating have been proposed and described in particular in documents EP 1584827, US 20050232757 and US 20060029494. However, all these solutions have limited durability. It is therefore necessary to regularly replace these cylindrical bushes, which involves an arduous operation of removing the turbomachine. In the aviation field, objectives of more than 40 000 flying hours without removing the turbomachine are required by the airlines. Such service lives are technically difficult to achieve and require complex and costly arrangements.

It is also a practice known from documents GB 825547, FR 1325261 and U.S. Pat. No. 3,471,126 to use a single swivel bearing to guide a blade pivot. However, the use of a single blade pivot does not sufficiently optimize the service life and the reduction of mechanical wear.

SUMMARY OF THE INVENTION

The main object of the present invention is to propose a device for controlling a pivot of a variable-pitch blade with an enhanced service life and making it possible to reduce the loads applied to the contact zones.

Another object of the invention is to reduce the leaks between the pivot and the bore. These leaks reduce the total efficiency of the turbomachine and may even damage the regulation means situated outside the compressor.

Accordingly, the invention relates in particular to a device for controlling a pivot of a variable-pitch blade comprising a control lever and a pivot comprising a bottom end and a top end, said top end being connected to the control lever. According to the invention, this device comprises two swivel bearings, a first swivel bearing being placed at the bottom end of the pivot and a second swivel bearing being placed at the top end of the pivot.

The invention also relates to a stator comprising a casing with an axis of revolution (Y) comprising at least one bore made along a radial axis (X) oriented perpendicularly to said axis of revolution (Y). According to the invention, this stator also comprises:
  at least one blade-pivot control device, and
  at least one blade oriented along the radial axis (X) placed inside the casing, said blade being fixedly attached to the pivot via the bottom end of said pivot,
  the swivel bearings being placed inside the bore.

The invention also relates to a compressor comprising such a stator and a turbomachine comprising said compressor.

Advantageously, the device proposed by the invention makes it possible to substantially reduce the loads applied to the contact zones. It then becomes possible to envisage using a wider range of materials capable of withstanding the wear.

BRIEF DESCRIPTION OF THE DRAWINGS

Other advantages and features of the invention will emerge on reading the following detailed description with reference to the appended drawings, supplied as nonlimiting examples, in which.

DESCRIPTION OF THE PREFERRED EMBODIMENTS

Figure 1:
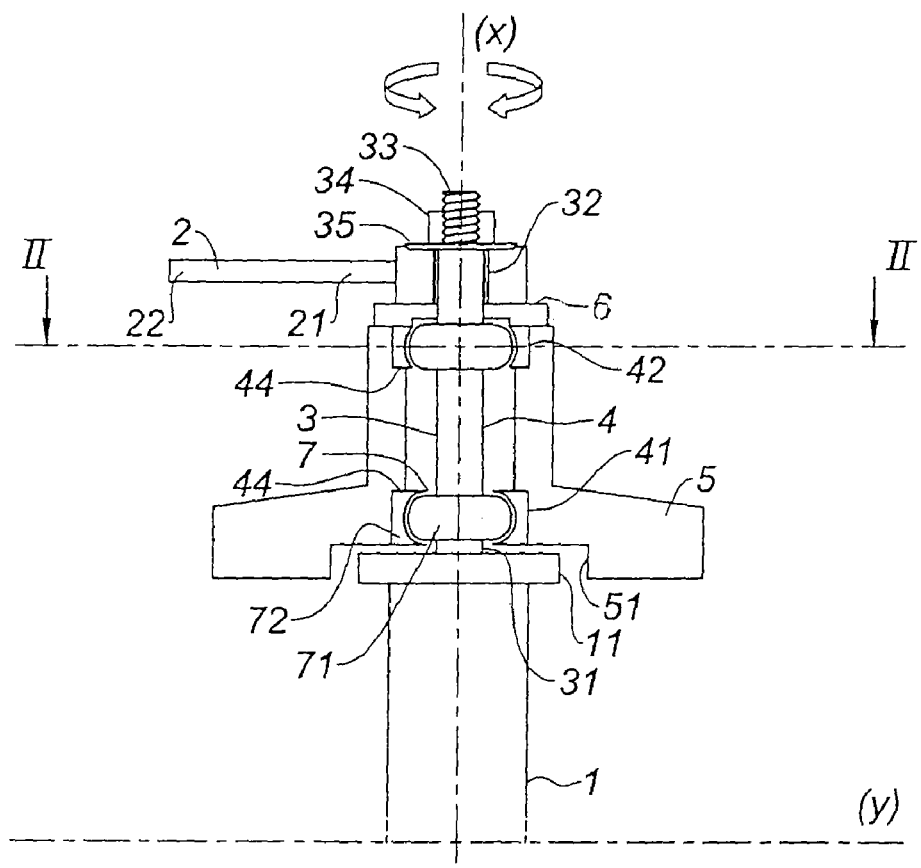
FIG. 1 represents a device for controlling a pivot of a variable-pitch blade according to the invention.

FIG. 1 represents a device for controlling the pitch of a blade 1 along an axis (X) oriented radially relative to the axis of revolution (Y) of a turbomachine casing. A pivot 3 is situated in the extension of a blade 1 and oriented along the same axis (X). The blade 1 and the pivot 3 may be separated by a plate 11, reconstituting a portion of the aerodynamic stream situated close by, placed in a facing 51 of the casing 5.

The pivot 3, comprising a bottom end 31 and a top end 32, is placed in a bore 4, comprising a bottom end 41 and a top end 42, usually made in the casing 5. Accordingly, the bore 4 may comprise at each of its ends 41 and 42 a facing 44, that is to say a cylindrical housing, designed to receive each swivel bearing 7. The attachment of the swivel bearing 7 in the bore 4 may be carried out by shrink-fitting, welding, brazing or any other equivalent method. Preferably, the swivel bearing 7 is attached prior to the mounting of the blades 1.

In the field of turbomachines, in the context of a part of revolution, it is normal to use the terms "top" and "bottom" instead of, respectively, "outer" and "inner".

The pivot 3 comprises, at its second end 32, a threaded rod 33 designed to interact with a nut 34 and a washer 35 in order to firmly connect it to a first end 21 of a control lever 2. A second end 22 of the control lever 2 is connected to a control ring (not shown). A second washer 6 may also be placed between the control lever 2 and the second top end 42 of the bore 4. Other means of connection between the pivot 3 and the control lever 2 can be envisaged without for all that compromising the principle of the invention. The rotation of the pivot 3 along the axis (X) makes it possible to vary the pitch of the blade 1.

According to the invention, the device comprises two swivel bearings 7, a first swivel bearing 7 being placed at the bottom end 31 of the pivot 3 and a second swivel bearing 7 being placed at the top end 32 of the pivot 3.

Figure 2:
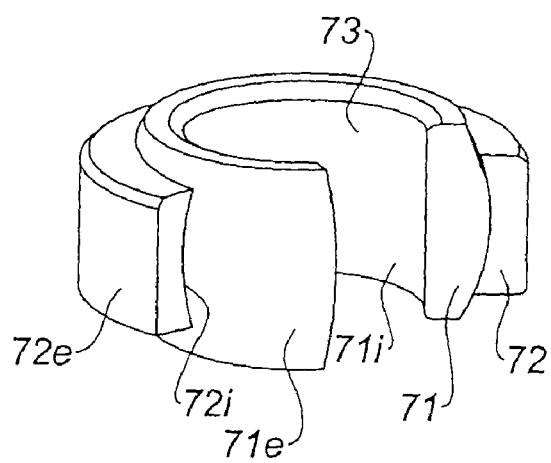
FIG. 2 represents a swivel bearing.

A swivel bearing 7 is shown in greater detail in FIG. 2. It comprises an inner race 71, comprising a cylindrical inner surface 71$i$ and a spherical outer surface 71$e$, and an outer race 72, comprising a spherical inner surface 72$i$ and an cylindrical outer surface 72$e$. The races 71 and 72 form, thanks to their spherical contact surfaces 71$e$ and 72$i$, a swivel connection, also called a spherical connection, that is to say a connection allowing three movements of rotation along three different axes. The pivot 3 traverses the swivel bearing 7 and is in contact with the cylindrical inner surface 71$i$ of the inner race 71. The swivel bearing 7 guides the pivot 3 in rotation along the axis (X). The swivel bearing 7 may be made in an organic material, such as for example polyimide; it may also be made of a metallic or ceramic material.

Although not essential, the inner race 71 of the swivel bearing 7 and the pivot 3 may be prevented from rotating relative to one another. This rotational block may be obtained in various ways. A section made along the line II-II of FIG. 1 represents, through several examples 3A, 3B, 3C, 3D and 3E, the connection between the swivel bearing 7 and the pivot.

Figure 3:
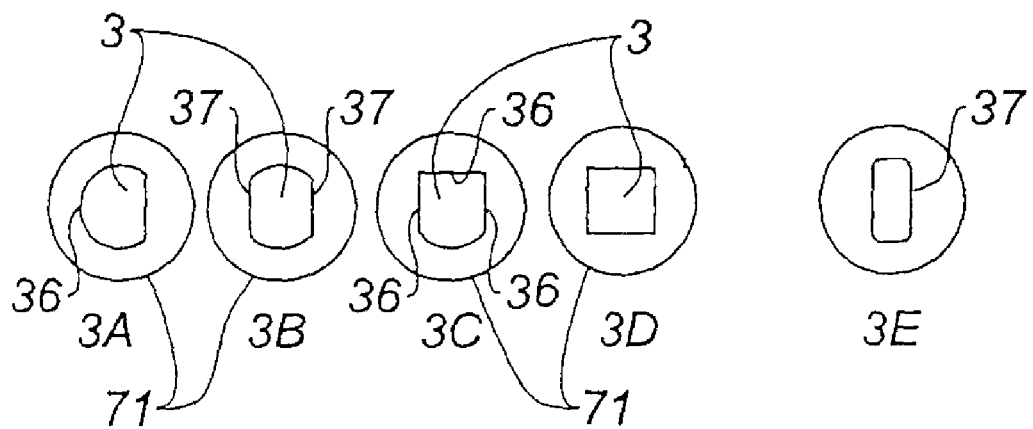
FIG. 3 represents a section made along the line II-II of FIG. 1 detailing the connection between the swivel bearing and the pivot according to different variants 3A, 3B, 3C, 3D and 3E.

According to first examples, illustrated in FIGS. 3A, 3B and 3C, the rotational block is obtained by the fact that the pivot 3 comprises at least one flat 36 on its outer surface, the inner shape of the inner race 71 being of matching shape.

According to second examples, illustrated in FIGS. 3B and 3E, the rotational block is obtained by the fact that the pivot 3 has a tenon shape 37 and that the inner shape of the inner race 71 has a mortice shape 37.

According to a third example, illustrated in FIG. 3D, the rotational block is obtained by the fact that the pivot 3 and the inner surface of the inner race 71 of the swivel bearing 7 have matching square-shaped sections.

To limit the vibrations between the pivot 3 and the inner surface 71$i$ of the inner race 71 of the swivel bearing 7, a damping or adhesive means 73 may be interposed between these two parts, for example a film made of plastic such as a silicone elastomer of the RTV (Room Temperature Vulcanizing) type, that is to say a silicone that can be cold polymerized. It also makes it possible to prevent wear on the pivot 3.

Figure 4:
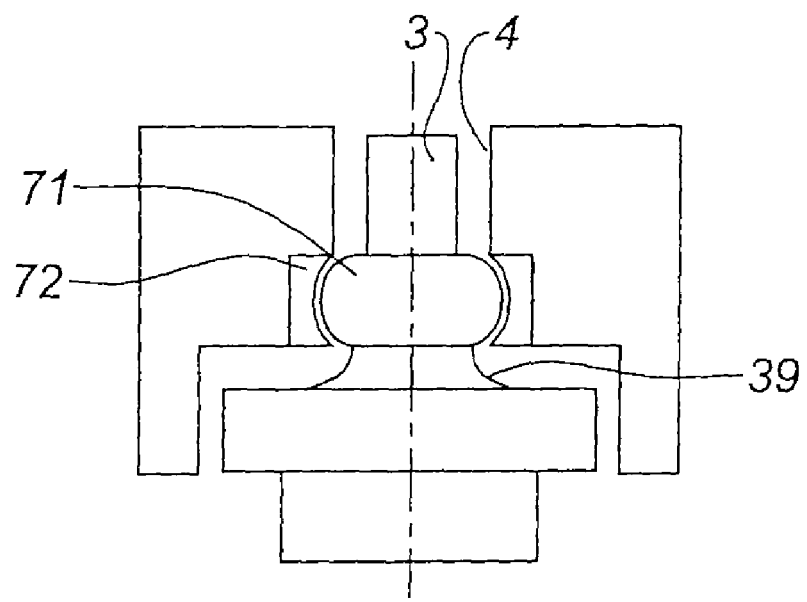
FIG. 4 represents a detail of a variant of the device for controlling a pivot of a variable-pitch blade according to the invention.

A variant that can be applied to the invention explained above consists in furnishing the pivot 3 with an end having a section 39 of increasing diameter in order to position the pivot 3 correctly relative to the swivel bearing 7 and the casing 5. This variant is illustrated in FIG. 4.

A sufficient clearance must be maintained between the plate 11 of the blade 1 and the swivel bearing 7 so that the operation of the device is not immobilized by a contact between the plate 11 and the casing facing 51 or the plate 11 and the outer race 72 of the swivel bearing 7.

Computations have shown that replacing a pivot connection, allowing a single rotational movement, with a swivel connection, allowing three rotational movements, makes it possible to reduce the loads applied to the contact zones. These computations were made taking into consideration two identical materials in contact having a Poisson's ratio of 0.3 and a Young's modulus of 200 000 Mpa.

In the case of a cylindrical bush placed about a pivot corresponding to an inner cylinder/outer cylinder contact, the following values were chosen: inner cylinder diameter of 15.72 mm and outer cylinder diameter of 15.612 mm, or a clearance of 0.108. Contact is made over a length lying between 1 and 4 mm depending on the alignment of the parts, with a tipping of the blade, that is to say an inclination of the latter relative to its axis (X) under the action of the aerodynamic force exerted. In extreme conditions, for example on take-off of an aircraft fitted with such a device, it was found by computation that the contact pressure varies from 84 to 167 Mpa depending on the alignment of the cylindrical bush.

In a slightly modified bore, replacing the cylindrical bush with a swivel bearing, comprising an inner race, whose inner diameter is 7.94 mm and whose outer diameter is 14.27 mm, and an outer race whose outer diameter is 19.05 mm, with a clearance of 0.018 mm between the two races, it was found by computation that, in the same operating conditions, the contact pressure is 40 Mpa. Consequently, thanks to the invention, a contact pressure is obtained that is at least half as great and even up to a quarter as great in the least favorable conditions observed under test.

In a device for controlling a variable-pitch blade using a swivel bearing 7 according to the invention, the leaks are smaller than in a device for controlling a variable-pitch blade using a cylindrical bush. This is explained by the fact that the clearance that exists between the inner race 71 and the outer race 72 of a swivel bearing 7 is very small. The invention therefore also makes it possible to reduce the leaks between the pivot and the bore. The efficiency of the turbomachine is therefore improved.

Another object of the invention also relates to a stator comprising:
- a casing 5 with an axis of revolution (Y) comprising at least one bore 4 made along a radial axis (X) oriented perpendicularly to said axis (Y),
- at least one device for controlling a pivot of a variable-pitch blade, and at least one blade 1 oriented along the radial axis (X) placed inside the casing 5, said blade 1 being fixedly attached to the pivot 3 via the bottom end 32 of said pivot 3, the swivel bearings 7 being placed inside the bore 4.

Figure 5:
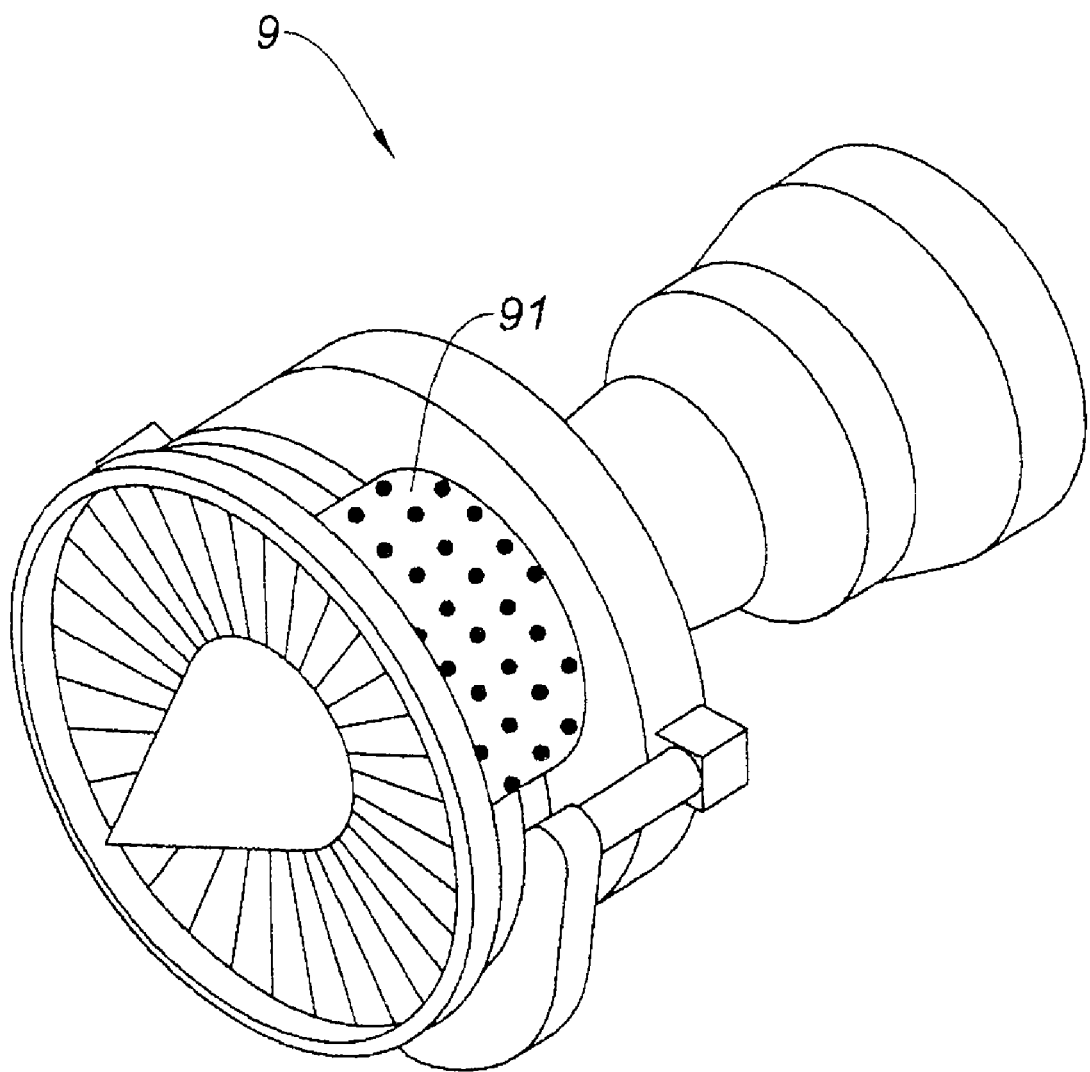
FIG. 5 represents a turbomachine.

The invention also relates to a compressor 91 comprising such a stator and a turbomachine 9 comprising such a compressor 91 as shown in FIG. 5.

The invention claimed is:

1. A device for controlling a pivot of a variable-pitch blade comprising:
    a control lever;
    a blade pivot with a bottom end and a top end, said top end being connected to the control lever; and
    first and second swivel bearings, the first swivel bearing being placed at the bottom end of the pivot and the second swivel bearing being placed at the top end of the pivot,
    wherein each of the first and second swivel bearings includes an inner race with a spherical outer surface and an outer race with a spherical inner surface, the spherical outer surface of the inner race cooperating with the spherical inner surface of the outer race to form a swivel connection, wherein the inner race of the swivel bearings and the pivot are prevented from rotating relative to one another.

2. The device for controlling a pivot of a variable-pitch blade as claimed in claim 1, wherein the pivot comprises at least one flat on its outer surface, the inner surface of the inner race comprising a matching shape.

3. The device for controlling a pivot of a variable-pitch blade as claimed in claim 1, wherein the pivot has a tenon shape and the inner shape of the inner race has a mortice shape.

4. The device for controlling a pivot of a variable-pitch blade as claimed in claim 1, wherein the pivot and the inner race of the swivel bearings have matching square-shaped sections.

5. The device for controlling a pivot of a variable-pitch blade as claimed in one of claims 2 to 4, wherein a plastic film is interposed between the pivot and an inner surface of the inner race of the swivel bearings.

6. A stator comprising a casing with an axis of revolution comprising at least one bore made along a radial axis oriented perpendicularly to said axis of revolution, which also comprises:
    at least one control device as claimed in claim 1, and
    at least one blade oriented along the radial axis placed inside the casing, said blade being fixedly attached to the pivot via the bottom end of said pivot,
    the swivel bearings being placed inside the bore.

7. The stator as claimed in claim 6, wherein the bore comprises at least one facing designed to receive a swivel bearing.

8. The stator as claimed in one of claim 6 or 7, wherein the attachment of a swivel bearing in the bore may be carried out by shrink-fitting, welding or brazing.

9. The stator as claimed in claim 6, wherein the bottom end of the pivot has an increasing diameter.

10. A compressor comprising:
    a stator including:
        a casing with an axis of revolution comprising at least one bore made along a radial axis oriented perpendicularly to said axis of revolution;
        at least one control device including a control lever; a blade pivot with a bottom end and a top end, said top end being connected to the control lever; and first and second swivel bearings, the first swivel bearing being placed at the bottom end of the pivot and the second swivel bearing being placed at the top end of the pivot; and
        at least one blade oriented along the radial axis placed inside the casing, said blade being fixedly attached to the pivot via the bottom end of said pivot,
        wherein each of the first and second swivel bearings includes an inner race with a spherical outer surface and an outer race with a spherical inner surface, the spherical outer surface of the inner race cooperating with the spherical inner surface of the outer race to form a swivel connection, and
        wherein the swivel bearings being placed inside the bore, pivot are prevented from rotating relative to one another.

11. A turbomachine comprising:
    a compressor including a stator, the stator including:
        a casing with an axis of revolution comprising at least one bore made along a radial axis oriented perpendicularly to said axis of revolution;
        at least one control device including a control lever; a blade pivot with a bottom end and a top end, said top end being connected to the control lever; and first and second swivel bearings, the first swivel bearing being placed at the bottom end of the pivot and the second swivel bearing being placed at the top end of the pivot; and
        at least one blade oriented along the radial axis placed inside the casing, said blade being fixedly attached to the pivot via the bottom end of said pivot,
        wherein each of the first and second swivel bearings includes an inner race with a spherical outer surface and an outer race with a spherical inner surface, the spherical outer surface of the inner race cooperating with the spherical inner surface of the outer race to form a swivel connection, and wherein the swivel bearings being placed inside the bore, wherein the inner race of the swivel bearings and the pivot are prevented from rotating relative to one another.

12. The device for controlling a pivot of a variable-pitch blade as claimed in claim 1, wherein the inner race of each of the first and second swivel bearings has a cylindrical inner surface.

13. The device for controlling a pivot of a variable-pitch blade as claimed in claim 12, wherein the cylindrical inner surface of the inner race of each of the first and second bearings abuts the pivot.

14. The device for controlling a pivot of a variable-pitch blade as claimed in claim 1, wherein the outer race of each of the first and second swivel bearings has a cylindrical outer surface.

15. The device for controlling a pivot of a variable-pitch blade as claimed in claim 1, wherein the top end of the blade pivot includes a threaded rod which cooperates with a nut and a washer to connect the top end of the blade pivot to the control lever.

* * * * *